United States Patent
Ninjouji

(10) Patent No.: US 8,830,167 B2
(45) Date of Patent: Sep. 9, 2014

(54) DATA PROCESSING APPARATUS AND RECORDING MEDIUM

(71) Applicant: DeNA Co., Ltd., Tokyo (JP)

(72) Inventor: Takashi Ninjouji, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/059,581

(22) Filed: Oct. 22, 2013

(65) Prior Publication Data

US 2014/0152548 A1    Jun. 5, 2014

(30) Foreign Application Priority Data

Nov. 30, 2012 (JP) .................................. 2012-263031

(51) Int. Cl.
*G06F 3/01* (2006.01)

(52) U.S. Cl.
CPC ........................................ *G06F 3/01* (2013.01)
USPC ................................. 345/156; 463/36; 463/37

(58) Field of Classification Search
None
See application file for complete search history.

(56) References Cited

U.S. PATENT DOCUMENTS

| | | | | |
|---|---|---|---|---|
| 7,762,893 B2 * | 7/2010 | Kando et al. | | 463/37 |
| 7,927,215 B2 * | 4/2011 | Sekimori | | 463/32 |
| 2005/0159223 A1 | 7/2005 | Tahara et al. | | |
| 2010/0292008 A1 * | 11/2010 | Matsumura | | 463/36 |

FOREIGN PATENT DOCUMENTS

| | | |
|---|---|---|
| JP | 2005-204754 | 8/2005 |
| JP | 2005-319175 | 11/2005 |
| JP | 2006-175059 | 7/2006 |
| JP | 2010-267079 | 11/2010 |
| JP | 2012-040059 | 3/2012 |

OTHER PUBLICATIONS

Japanese Office Action mailed Nov. 12, 2013.

\* cited by examiner

*Primary Examiner* — Joseph Haley
(74) *Attorney, Agent, or Firm* — IPUSA, PLLC

(57) ABSTRACT

A data processing apparatus includes an operation definition management unit that manages definition data in which a pattern of a predetermined operation input including a specification of an object to which an effect is generated is corresponded with an effect; an operation input accepting unit that accepts an operation input by a user; an operation input recognizing processing unit that recognizes the operation input accepted by the operation input accepting unit by referring to the definition data; and an effect control unit that performs the effect of the definition data corresponding to the operation input recognized by the operation input recognizing processing unit.

5 Claims, 22 Drawing Sheets

421

| TRACE ID | NAME | TRACE | EFFECT | FACING DIRECTION |
|---|---|---|---|---|
| 1 | ALL GUARD | 7−4−1−2−3−6−9 | GUARD BY ALL CHARACTERS TO DRASTICALLY REDUCE DAMAGE | UPPER |
| 2 | FRONT GUARD + SIDE ATTACK | 1−2−3, 7−4−1, 9−6−3 | GUARD BY CHARACTERS AT FRONT ROW AND ATTACK BY CHARACTERS AT SIDE COLUMNS | UPPER |
| . . | . . | . . | . . | . . |

FIG.5

| 1 | 2 | 3 |
|---|---|---|
| 4 | 5 | 6 |
| 7 | 8 | 9 |

| BOX | CHARACTER EFFECT: R, L |
|---|---|
| 1 | R: ATTACK TWICE, L: NONE |
| 2 | R: NONE, L: ONE RECOVERY |
| 3 | R: ATTACK DOUBLE, L: NONE |
| 4 | R: NONE, L: ALL RECOVERY |
| 5 | R: ATTACK IN DESPAIR, L: NONE |
| 6 | R: NONE, L: SHIELD |
| 7 | R: ATTACK TWICE, L: NONE |
| 8 | R: ATTACK TWICE, L: NONE |
| 9 | R: ATTACK TWICE, L: NONE |

FIG.7

| TRACE ID | NAME | TRACE | EFFECT | FACING DIRECTION |
|---|---|---|---|---|
| 1 | ALL GUARD | 7-4-1-2-3-6-9 | GUARD BY ALL CHARACTERS TO DRASTICALLY REDUCE DAMAGE | UPPER |
| 2 | FRONT GUARD + SIDE ATTACK | 1-2-3, 7-4-1, 9-6-3 | GUARD BY CHARACTERS AT FRONT ROW AND ATTACK BY CHARACTERS AT SIDE COLUMNS | UPPER |
| .. | .. | .. | .. | .. |

| BOX | CHARACTER ID |
|-----|--------------|
| 1 | 100001 |
| 2 | 100017 |
| 3 | 100039 |
| 4 | 100049 |
| 5 | 100003 |
| 6 | 100040 |
| 7 | 100020 |
| 8 | 100049 |
| 9 | 100023 |

FIG.9

| PLAYER ID | PLAYER NAME | STATUS | POINT | POSSESSING CHARACTER ID |
|---|---|---|---|---|
| 1 | AAA | 16 | 950 | 1, 3, 21, 55, ‥ |
| 2 | BBB | 1 | 73 | 3, 18, ‥ |
| 3 | CCC | 2 | 126 | 1, 5, 20, ‥ |
| ‥ | ‥ | ‥ | ‥ | ‥ |

FIG.10

| CHARACTER ID | CHARACTER NAME | CHARACTER IMAGE | CHARACTER STRENGTH (LEVEL, HP, MP, OFFENCE, DEFENSE...) | ... |
|---|---|---|---|---|
| 1 | FIGHTER | 1.gif | 37/505/0/215/189/.. | : |
| 2 | DRAGON | 2.gif | 35/306/0/158/147/.. | : |
| 3 | PHOENIX | 3.gif | 37/1040/200/265/178/.. | : |
| .. | .. | .. | .. | .. |

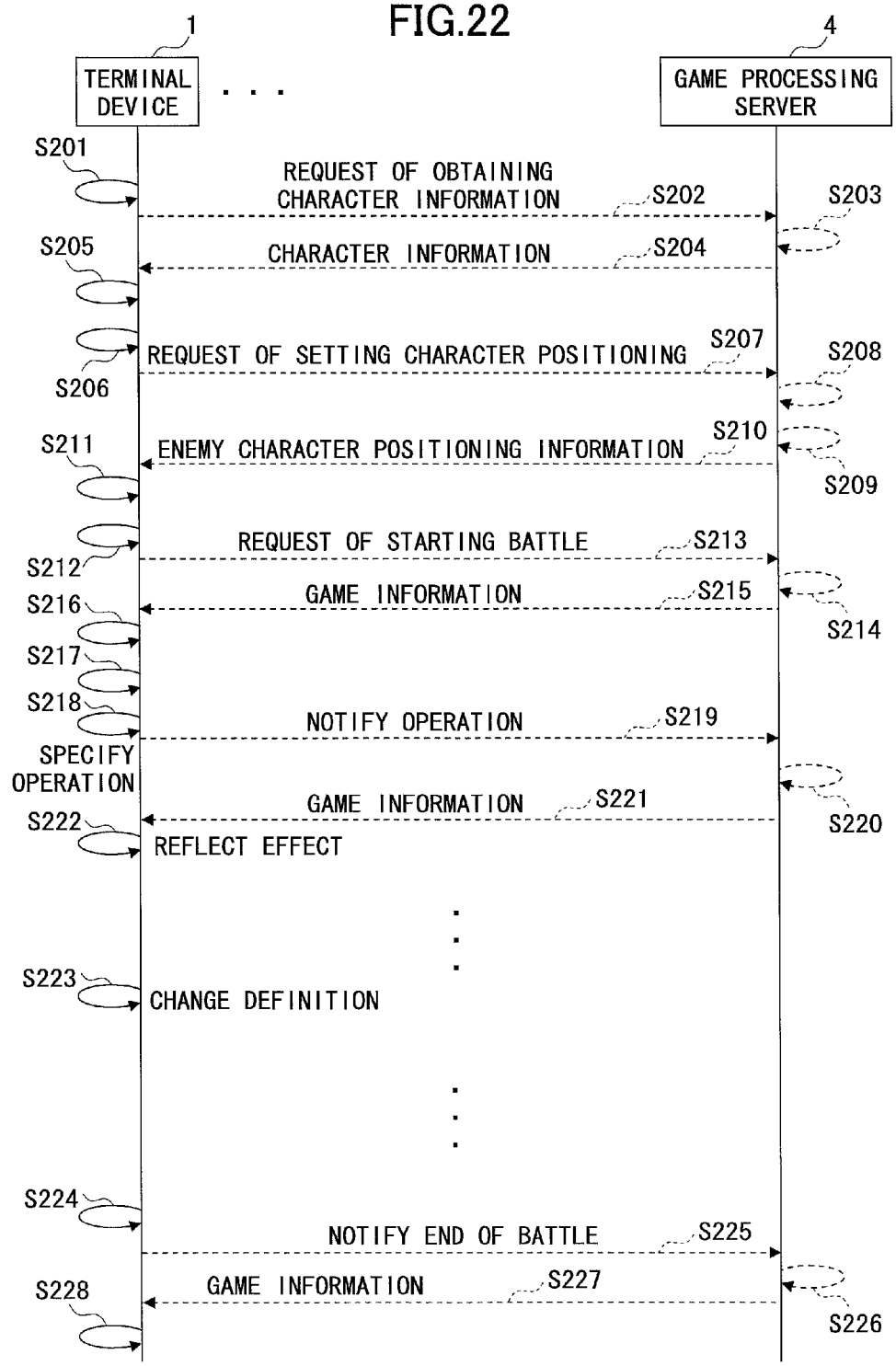

DATA PROCESSING APPARATUS AND RECORDING MEDIUM

BACKGROUND OF THE INVENTION

1. Field of the Invention

The present invention relates to a data processing apparatus and a recording medium.

2. Description of the Related Art

There are games in which a character is positioned in a virtual game space to fight against an enemy character, such as a game called "Valkyries in the Twilight" by DeNA Co. Ltd. (http://www.mbga.jp/pc/html/sg_valk/index.html), for example.

However, in this kind of game, the player can only control positioning of the character in the virtual game space and there is a problem in that the player cannot become sufficiently interested.

Further, there are games in which a special effect is generated by a gesture composed of a trace of a pointing operation of a player, such as "Pokémon (registered trademark) ranger optical trace" by Nintendo Co. Ltd. (http://www.pokemon.co.jp/special/ranger3/), for example).

However, in this kind of game, the operation content only relies on the shape of the trace composing the gesture so that there is not enough variation for the player to become sufficiently interested.

Further, a function called a "mouse gesture" is known by which an application operation of a user is assisted by a gesture composed of a trace of a pointing operation.

However, in this kind of game as well, similar to the above described "Pokémon (registered trademark) ranger optical trace", the operation content only relies on the shape of the trace composing the gesture and there is a problem in that a response cannot be flexibly changed in accordance with a context of application.

Further, conventionally, in a battle scene in a role-playing game (RPG) or the like, a player (user) may select in advance characters to participate in a battle from a character list of characters possessed by the player, or may select characters to participate in the battle for each battle (or each battle turn in the battle) (see Patent Document 1, for example).

However, there is a problem in that a response cannot be flexibly changed in accordance with a context of application.

Patent Document

[Patent Document 1] Japanese Laid-open Patent Publication No. 2012-040059

SUMMARY OF THE INVENTION

The present invention is made in light of the above problems, and provides a data processing apparatus and a recording medium by which an effect is flexibly generated in accordance with an operation input by a player.

According to an embodiment, there is provided a data processing apparatus including an operation definition management unit that manages definition data in which a pattern of a predetermined operation input including a specification of an object to which an effect is generated is corresponded with an effect; an operation input accepting unit that accepts an operation input by a user; an operation input recognizing processing unit that recognizes the operation input accepted by the operation input accepting unit by referring to the definition data; and an effect control unit that performs the effect of the definition data corresponding to the operation input recognized by the operation input recognizing processing unit.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of boxes of a matrix at which characters are positioned;

FIG. 6 is a view illustrating an example of a data structure of operation/effect definition data;

FIG. 7 is a view illustrating another example of a data structure of the operation/effect definition data;

FIG. 8 is a view illustrating an example of a data structure of the position setting data;

FIG. 9 is a view illustrating an example of a data structure of player information;

FIG. 10 is a view illustrating an example of a data structure of character information;

FIG. 22 is a sequence diagram illustrating another example of a process of the embodiment.

DETAILED DESCRIPTION OF THE PREFERRED EMBODIMENTS

Figure 1:
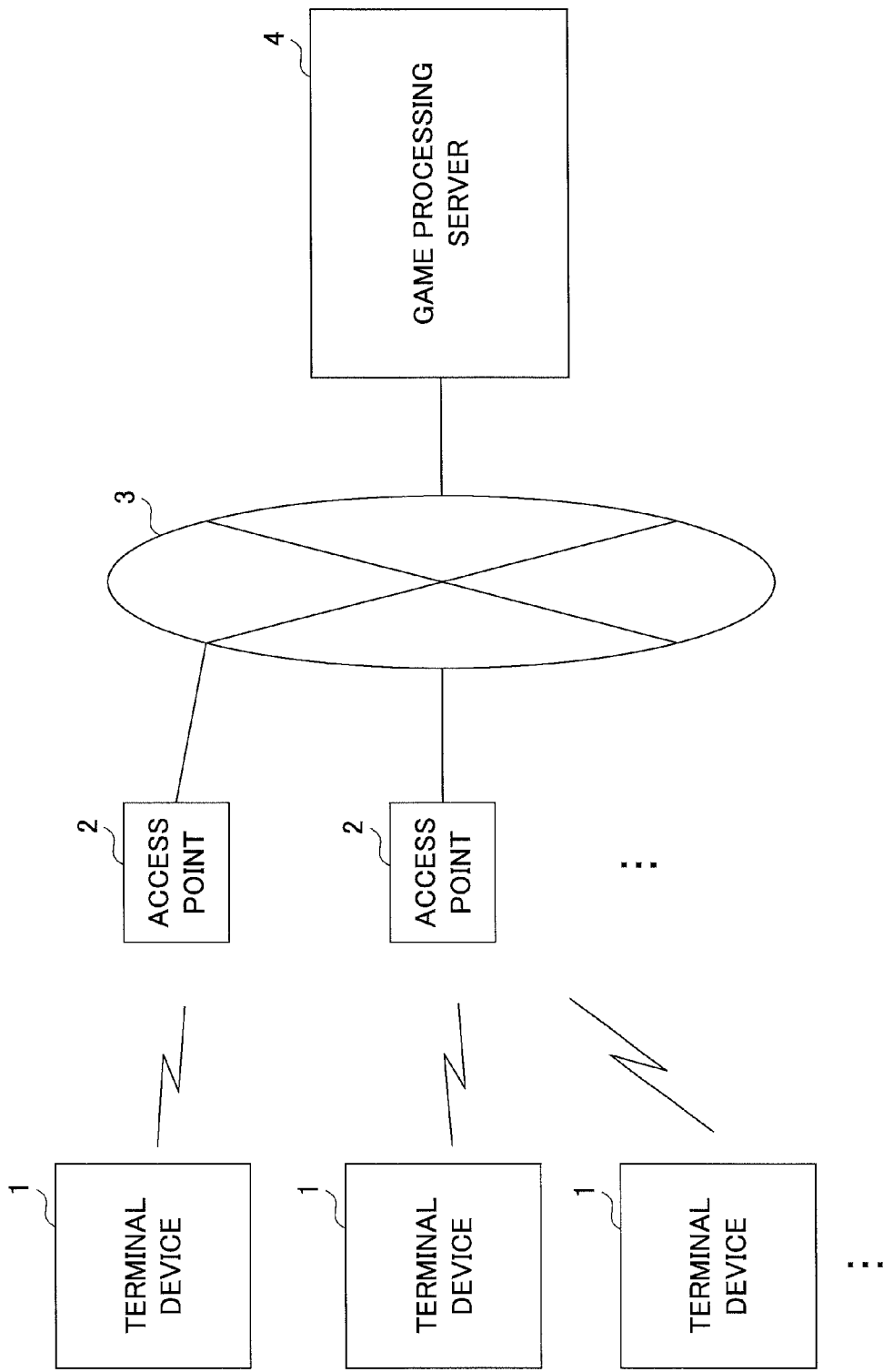
FIG. 1 is a block diagram illustrating an example of a structure of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

FIG. 1 is a block diagram illustrating an example of a structure of a system of an embodiment. Here, although a case in which the system is applied to game is explained in the following, it should be understood that the system can be applied to a service other than game.

The system includes terminal devices (player terminals) 1 such as a smartphone, a mobile phone or the like possessed by a player of a game, access points 2 such as a mobile station, a Wi-Fi station or the like, a network 3 such as INTERNET or the like, a game processing server 4 that manages (controls) a game played by a plurality of players via the network 3.

Figure 2:
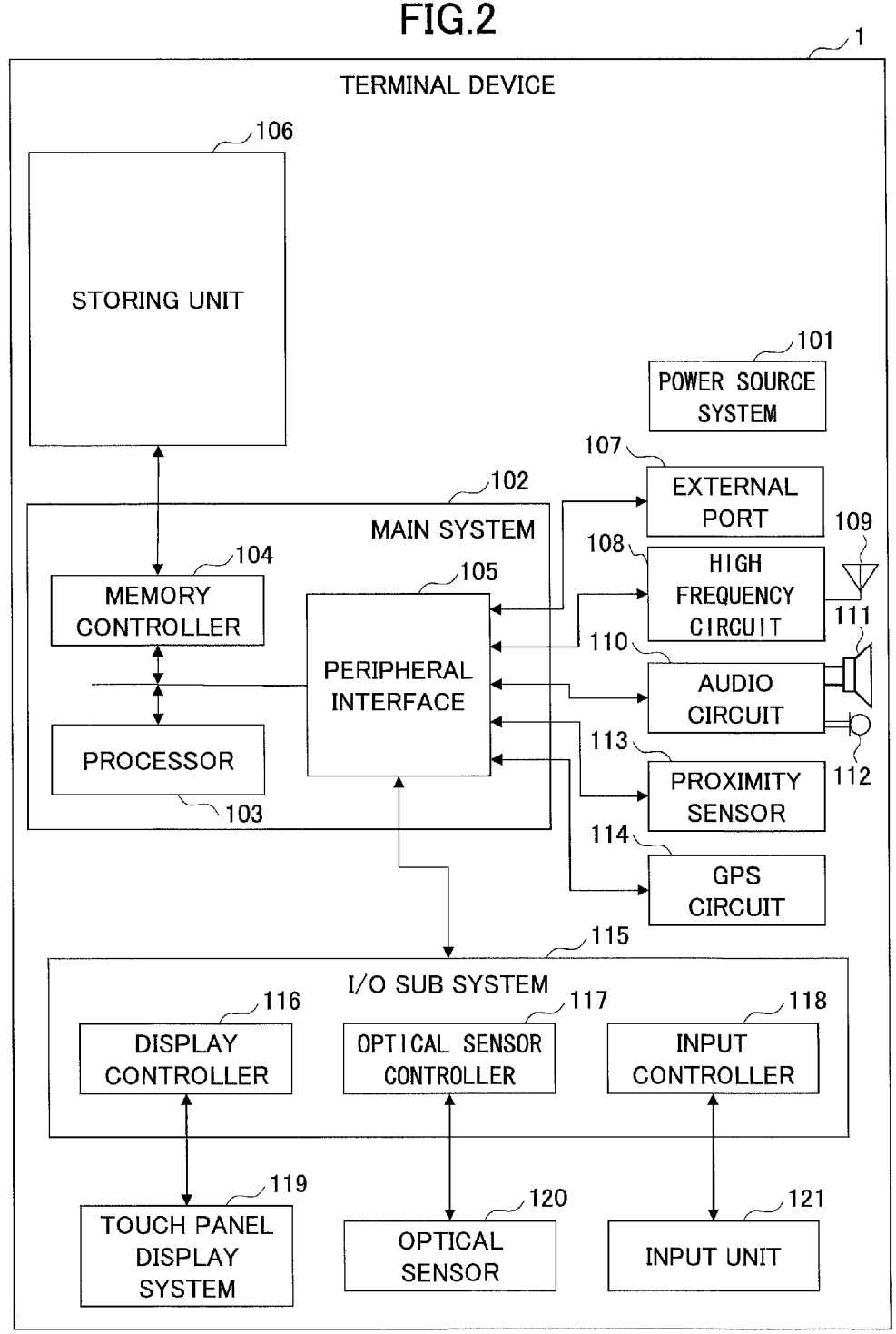
FIG. 2 is a block diagram illustrating an example of a hardware structure of a terminal device.

FIG. 2 is a block diagram illustrating an example of a hardware structure of the terminal device 1.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, a Global Positioning System (GPS) circuit 114, an I/O sub system 115, a touch panel display system 119, an optical sensor 120 and an input unit 121. The main system 102 includes a processor 103, a memory controller 104 and a peripheral interface 105. The I/O sub system 115 includes a display controller 116, an optical sensor controller 117 and an input controller 118.

Figure 3:
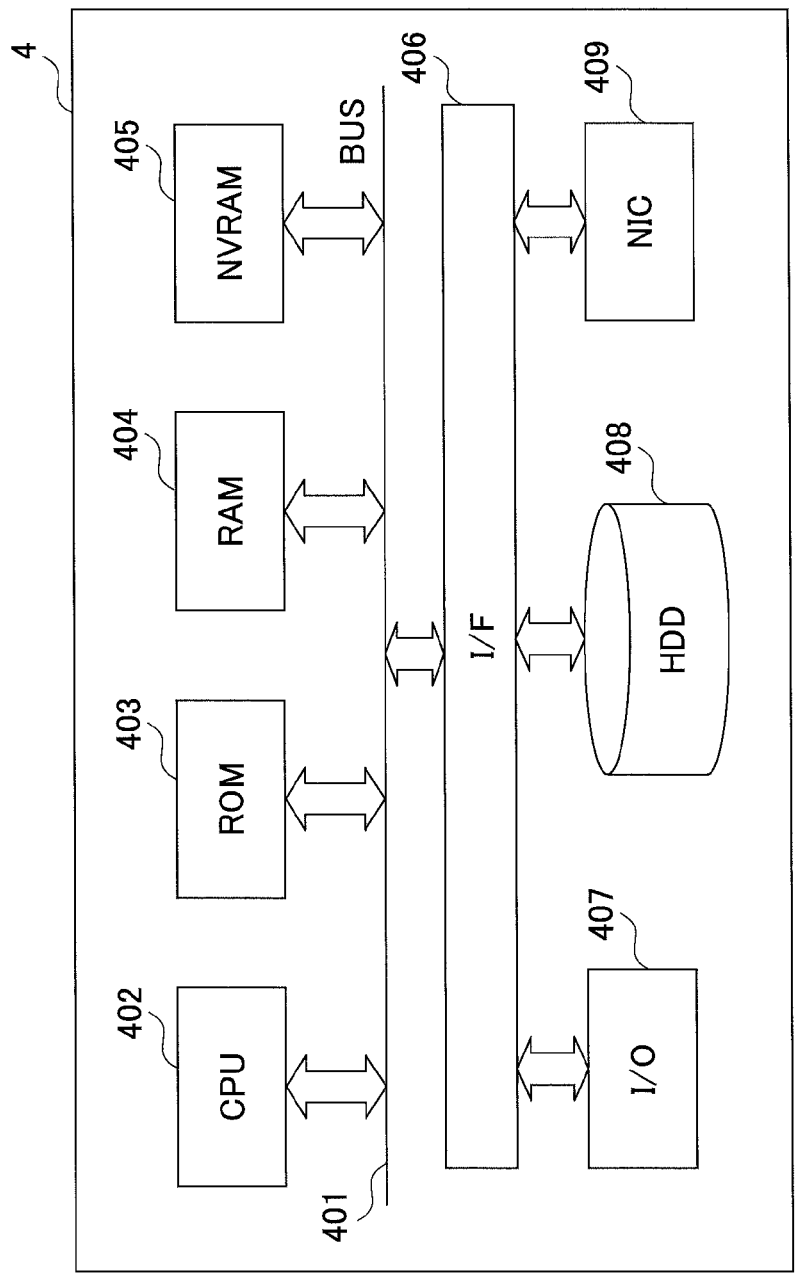
FIG. 3 is a block diagram illustrating an example of a hardware structure of a game processing server.

FIG. 3 is a block diagram illustrating an example of a hardware structure of the game processing server 4.

The game processing server 4 includes a Central Processing Unit (CPU) 402, a Read Only Memory (ROM) 403, a Random Access Memory (RAM) 404, a Non-Volatile Random Access Memory (NVRAM) 405 and an Interface (I/F) 406, which are connected to a system bus 401. The game processing server 4 further includes an Input/Output Device (I/O) 407 such as a keyboard, a mouse, a monitor, a Compact Disk/Digital Versatile Disk (CD/DVD) drive or the like, a Hard Disk Drive (HDD) 408 and a Network Interface Card (NIC) 409, which are connected to the I/F 406, or the like.

Figure 4:
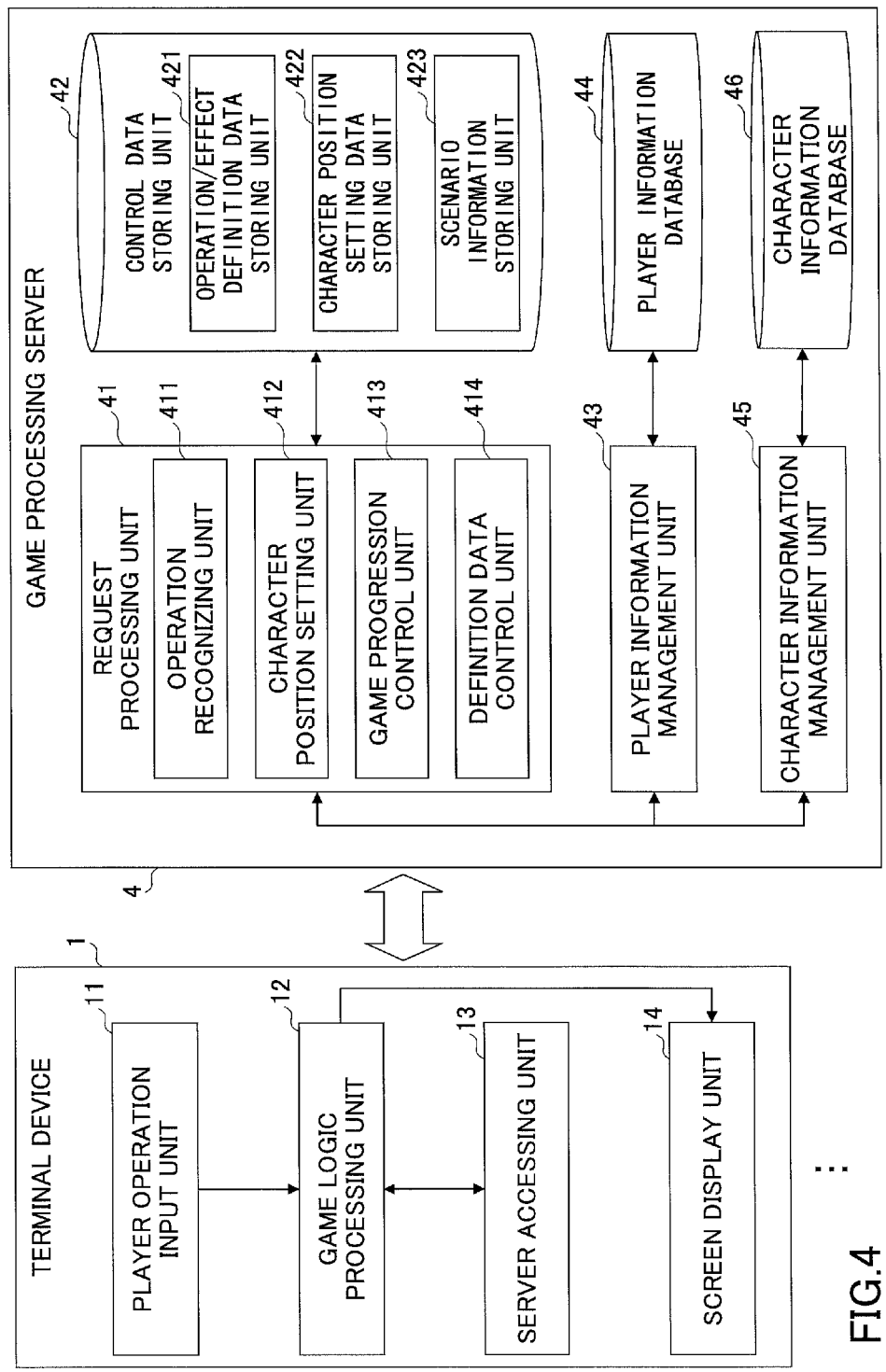
FIG. 4 is a block diagram illustrating an example of a functional structure of the terminal device and the game processing server of the embodiment.

FIG. 4 is a block diagram illustrating an example of a functional structure of the terminal device 1 and the game processing server 4 of the embodiment.

(Terminal Device 1)

The terminal device 1 includes a player operation input unit 11, a game logic processing unit 12, a server accessing unit 13 and a screen display unit 14.

The player operation input unit 11 has a function to input (accept) an operation of a player that operates the terminal device 1. The operation input by the player may be by any methods provided that the operation input is detectable by the terminal device 1 or an external device.

The game logic processing unit 12 has a function to process a game by transitioning screens in accordance with an input operation of the player input by the player operation input unit 11. The game logic processing unit 12 may process the game logic based on page data described in a Hyper Text Markup Language (HTML) or the like and scripts or the like included in the page data sent from the game processing server apparatus 4 (which is called browser type). Alternatively, the game logic processing unit 12 may process the game logic based on an application which is previously downloaded and installed in the terminal device 1 (which is called application type).

The server accessing unit 13 has a function to send a request to the game processing server 4 and receive a processed result or the like as a response from the game processing server 4 when it is necessary to access the game processing server 4 in a course of the processing by the game logic processing unit 12. Here, the request includes a request of updating and a request of referring to data. The request of updating is to update player information or the like. The request of referring to data is to refer to the player information or the like.

The screen display unit 14 has a function to display screens of the terminal device 1 under control of the game logic processing unit 12.

(Game Processing Server 4)

The game processing server 4 includes a request processing unit 41, a control data storing unit 42, a player information management unit 43, a player information database 44, a character information management unit 45 and a character information database 46. The control data storing unit 42 includes an operation/effect definition data storing unit 421 (definition data), a character position setting data storing unit 422, and a scenario information storing unit 423.

The request processing unit 41 has a function to receive a request from the terminal device 1, process a corresponding process and send a processed result of the request to the terminal device 1 as a response. When the request processing unit 41 receives the request of updating, the request processing unit 41 performs an operation to update the player information or the like, and sends the updated player information or the like that is changed by the operation as the processed result. When the request processing unit 41 receives the request of referring to data, the request processing unit 41 refers to and obtains the corresponding player information or the like, and sends the obtained player information or the like as the processed result. Here, the response by the request processing unit 41 may include screen information which is to be operated by the player next, in addition to the required processed result, for the browser type.

The request processing unit 41 includes an operation recognizing unit 411 (examples of an operation input accepting unit and an operation input recognizing processing unit), a character position setting unit 412, a game progression control unit 413 (an example of an effect control unit) and a definition data control unit 414 (an example of an operation definition management unit).

The operation recognizing unit 411 is a functional unit mainly used for the browser type. Upon accepting a content of a predetermined operation input from the terminal device 1, the operation recognizing unit 411 has a function to specify the corresponding operation and an effect corresponding to the operation based on the operation/effect definition data stored in the operation/effect definition data storing unit 421 of the control data storing unit 42. For the application type, the game logic processing unit 12 of that of the terminal device 1 has a function corresponding to the operation recognizing unit 411.

The character position setting unit 412 has a function to set, when accepting positioning of characters (game characters) in a game space from the terminal device 1, the positioning of the characters in the character position setting data storing unit 422 of the control data storing unit 42. For the browser type, the character position setting unit 412 performs a process of starting to the end of the positioning.

The game progression control unit 413 is a functional unit mainly used for the browser type. The game progression control unit 413 has a function to control game progression based on the scenario information stored in the scenario information storing unit 423 of the control data storing unit 42 and the operation and the effect specified by the operation recognizing unit 411. For the application type, the game logic processing unit 12 of the terminal device 1 has a function corresponding to the game progression control unit 413.

The definition data control unit 414 is a functional unit mainly used for the browser type. The definition data control unit 414 has a function to change the operation/effect definition data stored in the operation/effect definition data storing unit 421 of the control data storing unit 42 in accordance with the game progression controlled by the game progression control unit 413. For the application type, the game logic processing unit 12 of that of the terminal device 1 has a function corresponding to the definition data control unit 414.

The player information database 44 stores various information of all of the players participating in the battle game. The player information management unit 43 has a function to manage the various information stored in the player information database 44. The player information management unit 43 has a function to refer to and update the player information stored in the player information database 44 in response to the request from the request processing unit 41.

The character information database 46 stores various information of all of the characters used in the game. The character information management unit 45 has a function to manage the various information stored in the character information database 46. The character information management unit 45 has a function to refer to and update the character information stored in the character information database 46 stores various information of all of the character in response to the request from the request processing unit 41.

Figure 5:
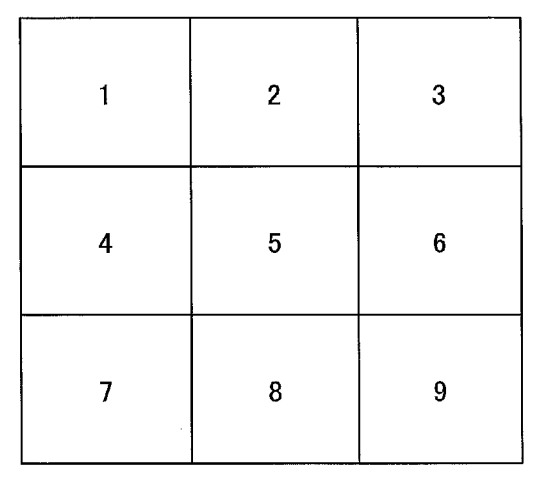

FIG. 5 is a view illustrating an example of boxes of a matrix at which characters are positioned. The character positioning boxes exemplified here is a matrix including a predetermined number of boxes in a column direction and a predetermined number of boxes in a row direction. Specifically, the matrix includes 3×3=9 boxes. The boxes of the matrix are respectively provided with identifiers "1" to "9" for specifying each of the boxes. Here, even the friend characters of the player are positioned as illustrated in FIG. 5, if an opponent (an enemy character) is a boss character or the like, the character of the opponent side may be differently positioned (only the boss character is positioned, for example).

FIG. 6 is a view illustrating an example of a data structure of the operation/effect definition data stored in the operation/effect definition data storing unit 421. The operation/effect definition data includes items (fields) such as "box", "character effect: R, L" and the like.

The "box" indicates data (No.) for specifying each of the boxes as illustrated in FIG. 5. The "character effect: R, L" indicates an effect that is generated when an operation input of a trace of a loop starting from and ended at the respective "box", either in a rightward direction (R) or a leftward direction (L), is recognized. The trace is recognized by detecting which of the characters or boxes is traced based on the comparison between position of a finger or the like on a touch panel or the like of the terminal device 1 and the position of the characters or the boxes (displayed position on the screen).

Here, the box (in other words, a character positioned at the respective box) is an object to which an effect is generated. For example, when a trace of a loop in a leftward direction from the box "2" as a starting point to the box "2" as an end point is input, it is specified that this operation corresponds to the box "2" and "L" (loop in the leftward direction) of the character effect so that the character effect becomes "one recovery" to the character.

FIG. 7 is a view illustrating another example of a data structure of the operation/effect definition data operation/effect definition data storing unit 421. The operation/effect definition data includes items (fields) such as "trace ID", "name", "trace", "effect", "facing direction" and the like.

The "trace ID" is data for specifying a trace. The "name" is a name of the respective trace. The "trace" is a content of the trace expressed by a combination of data specifying the boxes illustrated in FIG. 5. The "trace" corresponding to the trace ID "1" in FIG. 7 is "7-4-1-2-3-6-9" that expresses a trace passing through the box "7", the box "4", the box "1", the box "2", the box "3", the box "6" and the box "9", in this order. It means that the box "7" is a starting point and the box "9" is an end point.

The "trace" corresponding to the trace ID "2" in FIG. 7 is "1-2-3", "7-4-1" and "9-6-3" that expresses that the traces "1-2-3", "7-4-1" and "9-6-3" are input in this order. These successive traces are cut each by each and are not a single trace. Here, the box included in the "trace" is an object to which an effect is generated.

The "effect" expresses an effect that is generated when the operation of the respective trace is recognized.

The "facing direction" indicates a direction at which the enemy character is positioned, which is a premise for the definition of the traces.

When the enemy character is positioned at an upper direction in FIG. 5, the "facing direction" is defined as "upper". Similarly, when the enemy character is positioned at a lower direction, a left side direction or a right side direction, the "facing direction" becomes "lower", "left" or "right", respectively. The "facing direction" corresponds to information of a positional relationship between an object (the enemy character, for example) on which the effect is exerted.

FIG. 8 is a view illustrating an example of a data structure of the position setting data stored in the position setting data storing unit 422. The position setting data includes items (fields) such as "box", "character ID" and the like. The "box" indicates data (No.) for specifying each of the boxes as illustrated in FIG. 5. The "character ID" is data for specifying the character positioned at the respective box.

FIG. 9 is a view illustrating an example of a data structure of the player information stored in the player information database 44.

The player information includes items (fields) such as "player ID", "player name", "status", "point", "possessing character ID" and the like. The "player ID" is data to specify (identify) the player. The "player name" is data for a display name of the player. The status" is data expressing a progression degree of the game.

The "point" is data expressing points obtained by the respective player in the game. The "possessing character ID" is data for specifying a character possessed by the respective player.

FIG. 10 is a view illustrating an example of a data structure of the character information stored in the character information database 46.

The character information includes items (fields) such as "character ID", "character name", "character image", "character strength", and the like. The "character ID" is data for specifying the character. The "character name" is data for a display name of the character. The "character image" is information of image file of the character. The "character strength" is data expressing ability (a game effect) of the character in the game. For example, the "character strength" includes parameters such as level, HP (hit point), MP (magic point), offence, defense and the like.

(Operation)

Figure 11:
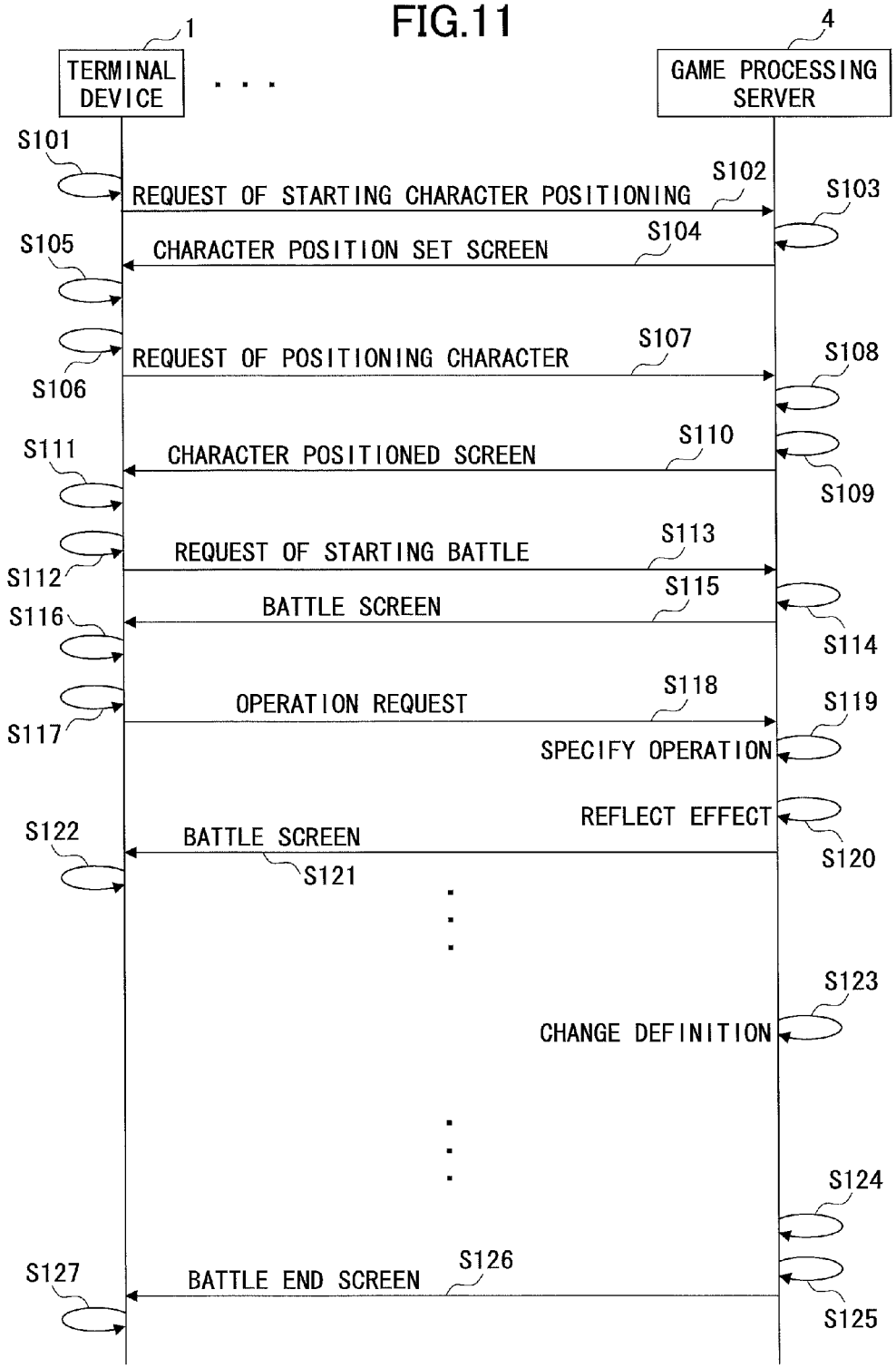
FIG. 11 is a sequence diagram illustrating an example of a process of the embodiment.

FIG. 11 is a sequence diagram illustrating an example of the process of the embodiment for the browser type.

When a player of the terminal device 1 performs a predetermined operation to instruct starting character positioning, and the player operation input unit 11 accepts the operation (step S101), under control of the game logic processing unit 12, the server accessing unit 13 sends a request of starting character positioning with the player ID or the like to the game processing server 4 (step S102).

At the game processing server 4, upon accepting the request of starting character positioning, the character position setting unit 412 of the request processing unit 41 generates a character position set screen (step S103) and sends the character position set screen to the terminal device 1 (step S104).

At the terminal device 1, under control of the game logic processing unit 12, the screen display unit 14 displays the character position set screen (step S105). Then, the player performs an operation of character positioning, and the player operation input unit 11 accepts the operation (step S106), under control of the game logic processing unit 12, the server accessing unit 13 sends a request of positioning character with the player ID or the like to the game processing server 4 (step S107). At this time, for example, the player designates one of the boxes (see FIG. 5) at which a character is to be positioned and designates one of the characters to position at the designated box from characters possessed by the player. When the player wants to position characters at all of the boxes of the matrix, respectively, the player repeats this operation for all of the boxes.

At the game processing server 4, upon accepting the request of positioning character, the character position setting unit 412 of the request processing unit 41 sets the character positioning in the character position setting data storing unit 422 of the control data storing unit 42 (step S108).

Then, the character position setting unit 412 of the request processing unit 41 generates a screen in which a character has been positioned (hereinafter, referred to as a "character positioned screen") (step S109), and sends the character positioned screen to the terminal device 1 (step S110).

At the terminal device 1, under control of the game logic processing unit 12, the screen display unit 14 displays the character positioned screen (step S111).

Figure 12:
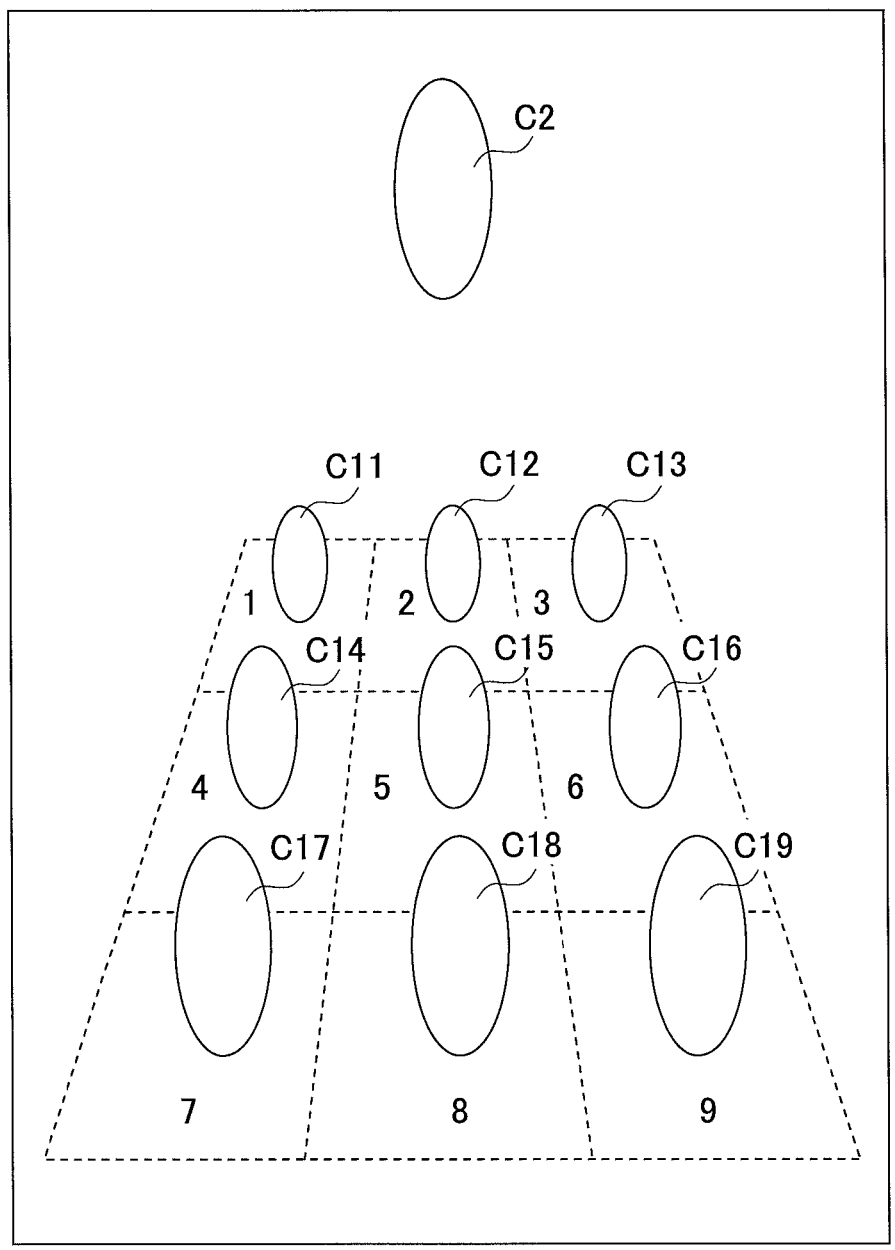
FIG. 12 is a view illustrating an example of a character positioned screen.

FIG. 12 is a view illustrating an example of the character positioned screen. In FIG. 12, an example is illustrated in which friend characters C11 to C19 are positioned at this side (a rear side) and an enemy character C2 is positioned at the front surface (an upper direction in FIG. 12). As will be explained later, by an operation such as tracing either of the friend characters C11 to C19 by a finger or the like, the player can instruct the respective friend character for offence, defense or the like. Although the characters are simply expressed as circles in FIG. 12, actually, the characters are displayed as fighters or the like. Further, although only the enemy character C2 is displayed in FIG. 12, when the opponent is another player, the number of enemy characters same as the friend characters are positioned for the opponent as well.

Figure 13:
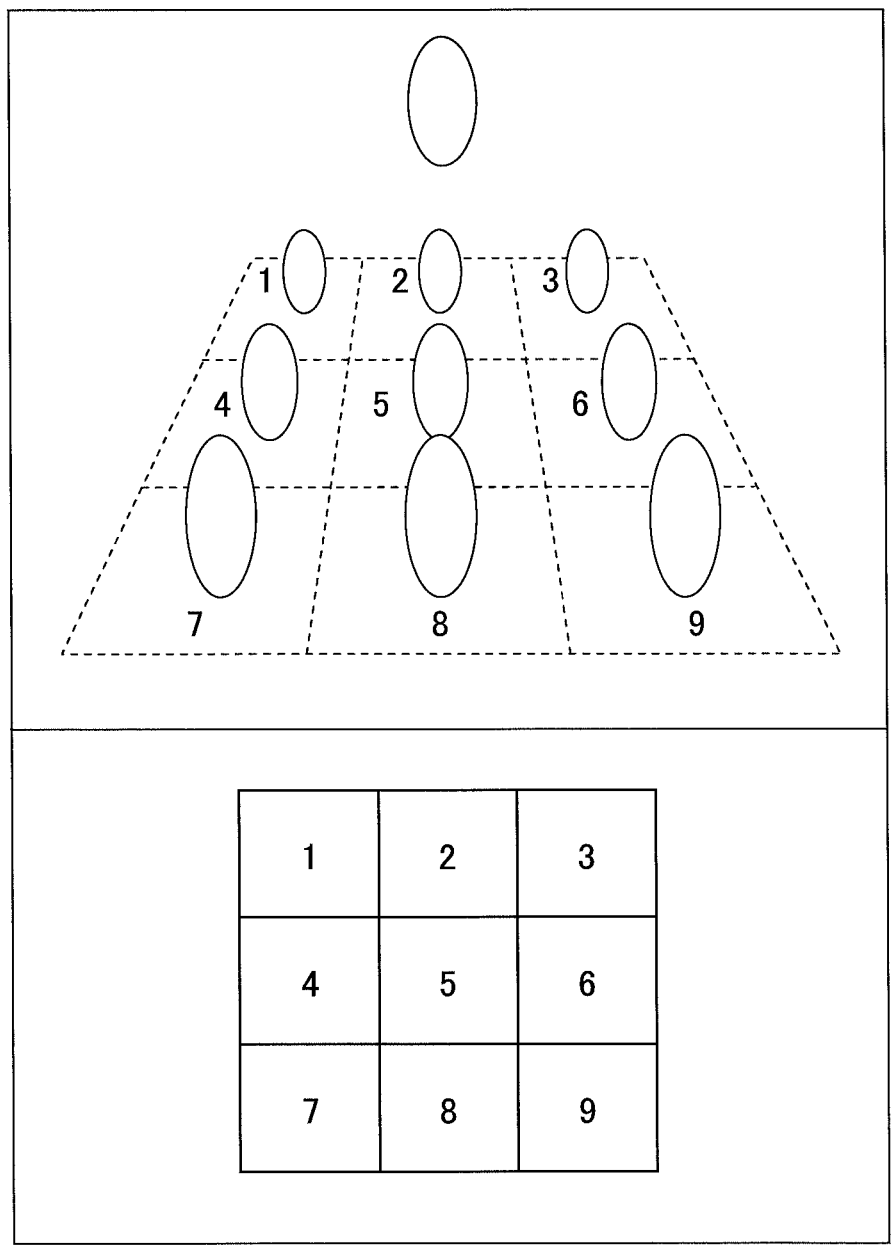
FIG. 13 is a view illustrating another example of the character positioned screen.

FIG. 13 is a view illustrating another example of the character positioned screen. In FIG. 13, a matrix having 3×3 boxes is displayed at a lower side of the screen in order to simplify the operation to the friend characters. At this time, by an operation such as tracing either of the boxes of the matrix displayed at the lower side of the screen by a finger or the like, the player can instruct the respective friend character for offence, defense or the like. Although not illustrated in FIG. 13, actually, icons or the like that indicate characters are displayed in the boxes of the matrix, respectively, displayed at the lower side of the screen.

Figure 14:
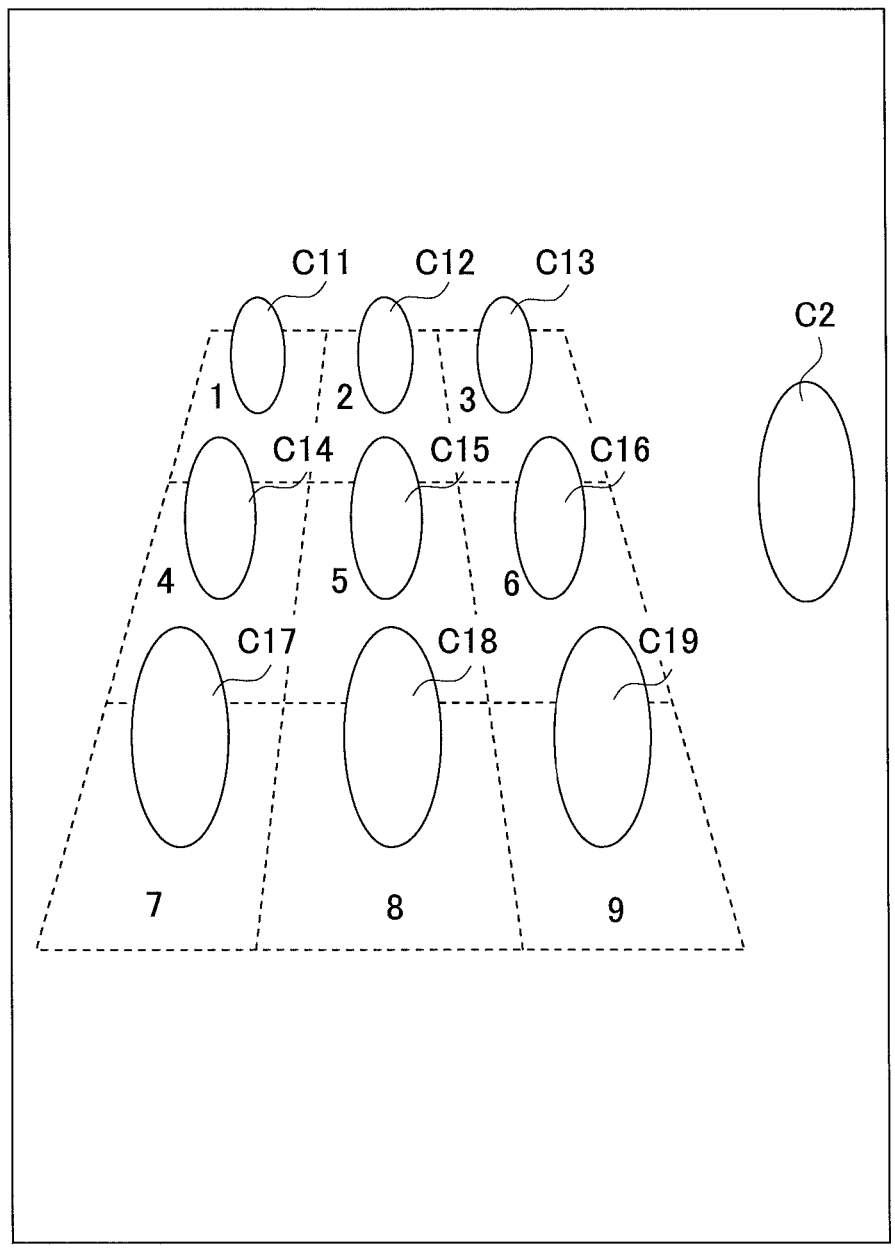
FIG. 14 is a view illustrating another example of the character positioned screen.

FIG. 14 is a view illustrating another example of the character positioned screen. In FIG. 14, an example is illustrated in which the friend characters C11 to C19 are positioned at a left side and the enemy character C2 is positioned at a right side. As will be explained later, by an operation such as tracing either of the friend characters C11 to C19 by a finger or the like, the player can instruct the respective friend character for offence, defense or the like.

Figure 15:
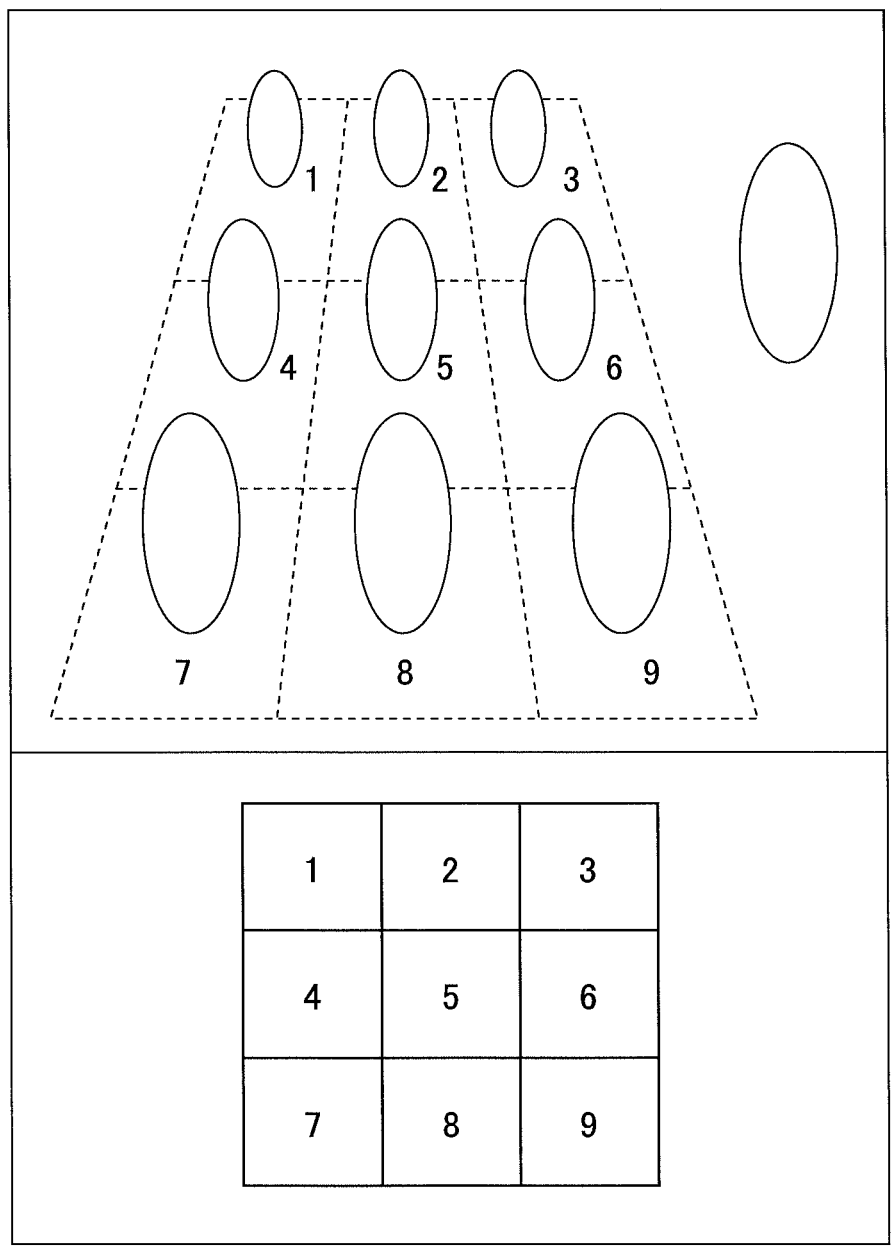
FIG. 15 is a view illustrating another example of the character positioned screen.

FIG. 15 is a view illustrating another example of the character positioned screen. In FIG. 15, a matrix having 3×3 boxes is displayed at a lower side of the screen in order to simplify the operation to the friend characters. At this time, by an operation such as tracing either of the boxes of the matrix displayed at the lower side of the screen by a finger or the like, the player can instruct the respective friend character for offence, defense or the like.

Referring back to FIG. 11, when the player of the terminal device 1 performs a predetermined operation to instruct starting a battle, and the player operation input unit 11 accepts the operation (step S112), under control of the game logic processing unit 12, the server accessing unit 13 sends a request of starting the battle with the player ID or the like to the game processing server 4 (step S113).

At the game processing server 4, upon accepting the request of starting the battle, the game progression control unit 413 of the request processing unit 41 generates a battle screen (step S114) and sends the battle screen to the terminal device 1 (step S115).

At the terminal device 1, under control of the game logic processing unit 12, the screen display unit 14 displays the battle screen (step S116). Then, the player performs a predetermined operation to the character or the box of the matrix, displayed in the screen, and the player operation input unit 11 accepts the operation (step S117), under control of the game logic processing unit 12, the server accessing unit 13 sends an operation request including an operation content with the player ID or the like to the game processing server 4 (step S118).

At the game processing server 4, upon accepting the operation request, the operation recognizing unit 411 of the request processing unit 41 specifies the operation based on the operation content and determines the effect corresponding to the specified operation (step S119). Examples of the operation content are explained in the following.

Figure 16A:
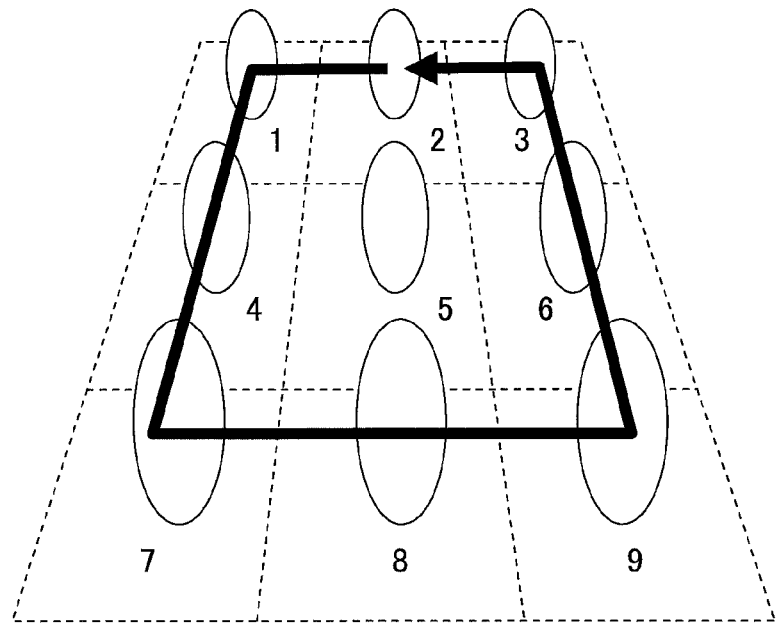
FIG. 16A and FIG. 16B are respective views illustrating an example of an operation by a player.
Figure 16B:
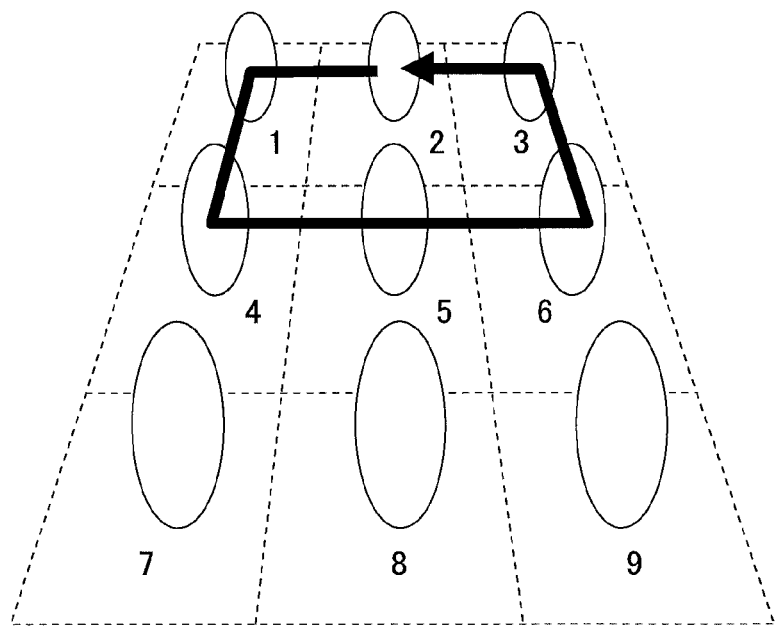
Figure 17A:
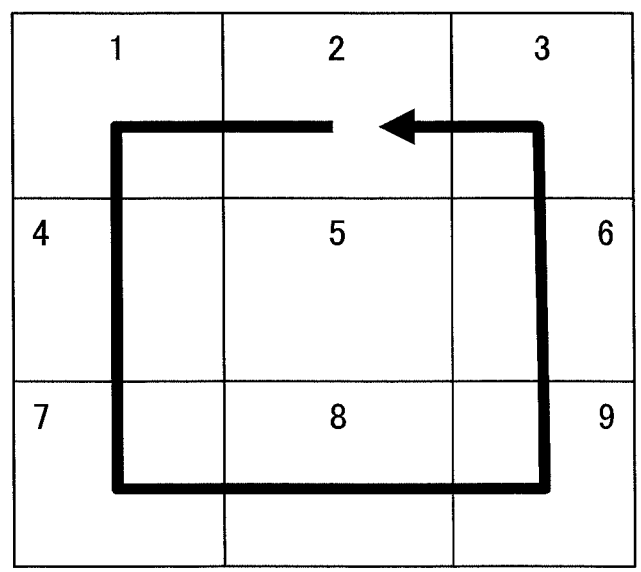
FIG. 17A and FIG. 17B are respective views illustrating another example of an operation by a player.
Figure 17B:
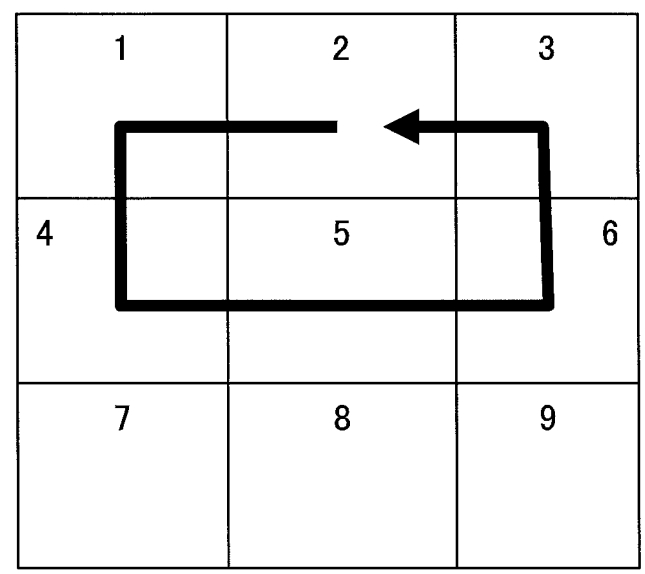

FIG. 16A and FIG. 16B are respective views illustrating an example of an operation by the player performed to the characters displayed in the screen. FIG. 16A and FIG. 16B only illustrate a part of the screen that is illustrated in FIG. 12 or FIG. 14 where the friend characters are displayed. Similarly, FIG. 17A and FIG. 17B are respective views illustrating an operation by the player performed to the boxes displayed in the screen. FIG. 17A and FIG. 17B only illustrate a part of the screen that is illustrated in FIG. 13 or FIG. 15 where the boxes of the matrix are displayed.

FIG. 16A and FIG. 17A illustrate the same operation by the player where a trace of a loop in a leftward direction from the box "2" as a starting point to the box "2" as an end point is input. At this time, the operation recognizing unit 411 refers to the operation/effect definition data storing unit 421 as illustrated in FIG. 6. Then, the operation recognizing unit 411 determines that this operation corresponds to the box "2" and "L" (loop in the leftward direction) of the character effect so that the character effect becomes "one recovery". As the effect is determined based on the box of the starting point and the end point, and the direction of the loop, whether in the leftward direction or in the rightward direction, the operations illustrated in FIG. 16B or FIG. 17B are recognized as the same trace as those illustrated in FIG. 16A and FIG. 17A.

Here, when the direction of the loop is the rightward direction for the examples illustrated in FIG. 16A to FIG. 17B, with reference to the operation/effect definition data storing unit 421 illustrated in FIG. 6, this operation corresponds to the box "2" and "R" (loop in the rightward direction) of the character effect so that the character effect becomes "none".

Further, by adding a branch condition indicating a trace to the character effect as illustrated in FIG. 6 in the operation/effect definition data storing unit 421, additional effects can be set for the traces as illustrated in FIG. 16A (FIG. 17A), FIG. 16B (FIG. 17B) or the opposite directions thereof. This means different effects can be set in accordance with the traces of the loops even for the loops starting from the same box.

Figure 18A:
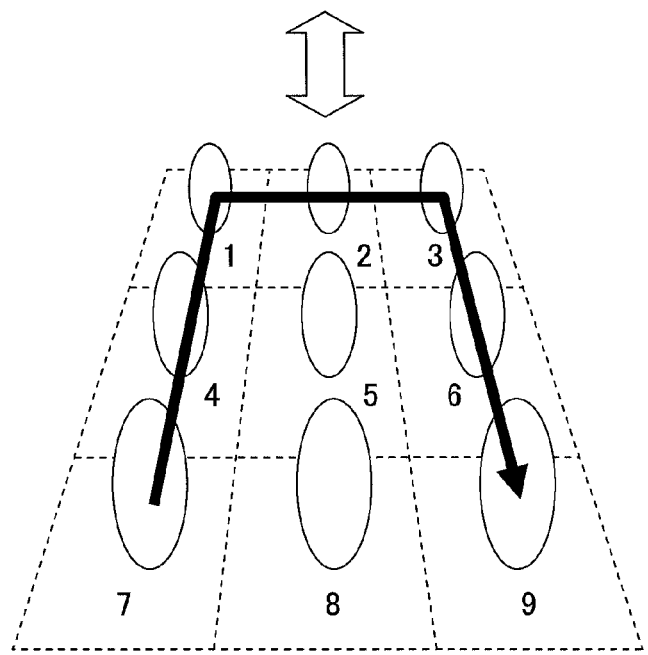
FIG. 18A and FIG. 18B are respective views illustrating another example of an operation by a player.
Figure 18B:
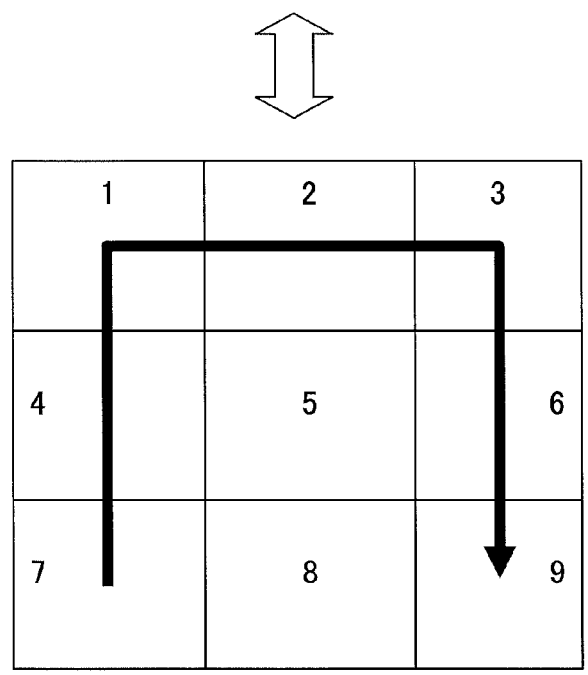

FIG. 18A is a view illustrating another example of an operation by the player performed to the characters displayed in the screen. FIG. 18B is a view illustrating another example of an operation by the player performed to the boxes displayed in the screen. FIG. 18A only illustrates a part of the screen that is illustrated in FIG. 12, in which the enemy character C2 is positioned at the front surface (upper), where the friend characters are displayed. FIG. 18B only illustrates a part of the screen that is illustrated in FIG. 13, in which the enemy character C2 is positioned at the front surface, where the boxes of the matrix are displayed.

As illustrated in FIG. 18A and FIG. 18B, when a trace passing through the box "7", the box "4", the box "1", the box "2", the box "3", the box "6" and the box "9", in this order, is input, the operation recognizing unit 411 refers to the operation/effect definition data storing unit 421 as illustrated in FIG. 7. Then, the operation/effect definition data storing unit 421 determines that this operation corresponds to the trace ID "1" as "upper" of the "facing direction" and "7-4-1-2-3-6-9" of the "trace" match. Then, the operation/effect definition data storing unit 421 specifies the "effect" as "guard by all characters to drastically reduce damage".

Here, the "trace" and the "effect" may be determined such that the "effect" can be instinctively imaged by the operation of the "trace". For example, in this case, the trace passing through the box "7", the box "4", the box "1", the box "2", the box "3", the box "6" and the box "9", in this order, is like surrounding the player's position so that this operation may cause the player to instinctively image defending by all of the characters by the trace.

Figure 19A:
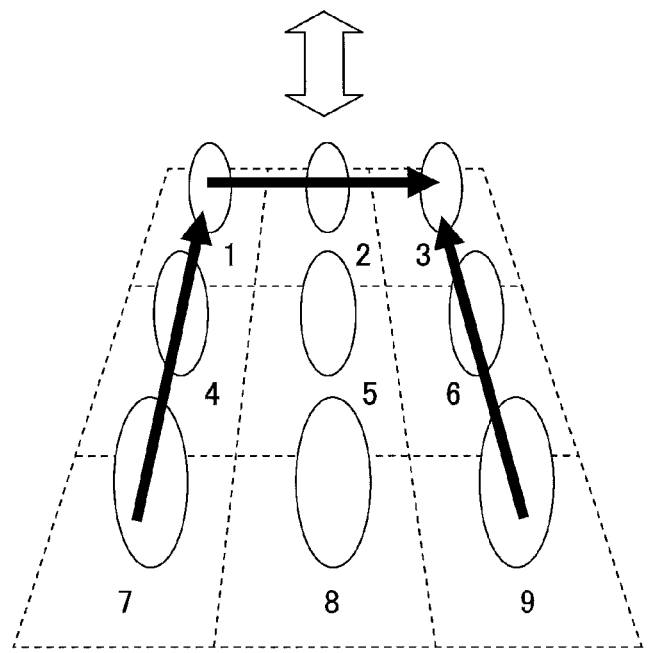
FIG. 19A and FIG. 19B are respective views illustrating another example of an operation by a player.
Figure 19B:
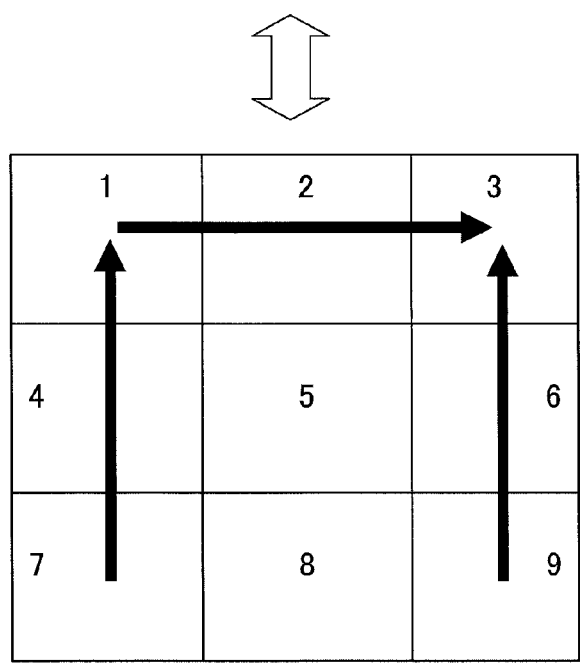

FIG. 19A is a view illustrating another example of an operation by the player performed to the characters displayed in the screen. FIG. 19B is a view illustrating another example of an operation by the player performed to the boxes displayed in the screen. FIG. 19A only illustrates a part of the screen that is illustrated in FIG. 12, in which the enemy character C2 is positioned at the front surface (upper), where the friend characters are displayed. FIG. 19B only illustrates a part of the screen that is illustrated in FIG. 13, in which the enemy character C2 is positioned at the front surface, where the boxes of the matrix are displayed.

As illustrated in FIG. 19A and FIG. 19B, when a trace passing through the box "7", the box "4" and the box "1", in this order, a trace passing through the box "1", the box "2" and the box "3", in this order, and a trace passing through the box "9", the box "6" and the box "3", in this order, are input, in this order, the operation recognizing unit 411 refers to the operation/effect definition data storing unit 421 as illustrated in FIG. 7. Then, the operation/effect definition data storing unit 421 determines that this operation corresponds to the trace ID "2" as "upper" for the "facing direction" and "1-2-3", "7-4-1" and "9-6-3" for the "trace" match. Then, the operation/effect definition data storing unit 421 specifies the "effect" as "guard by characters at front row and attack by characters at side columns".

Here, in this case, the trace passing through the box "1", the box "2" and the box "3", in this order, may cause the player to instinctively image guarding against the facing enemy character, and the traces passing through the box "7", the box "4" and the box "1", in this order, and passing through the box "9", the box "6" and the box "3", in this order, may cause the player to instinctively image attacking against the facing enemy character.

Figure 20A:
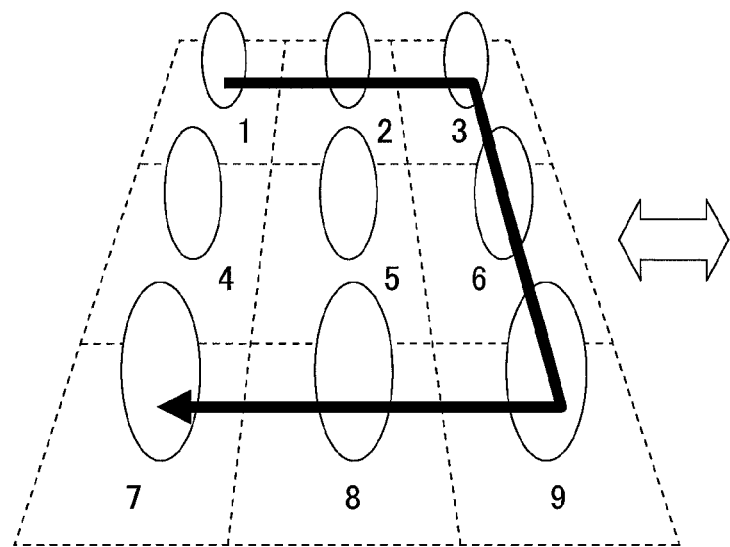
FIG. 20A and FIG. 20B are respective views illustrating another example of an operation by a player.
Figure 20B:
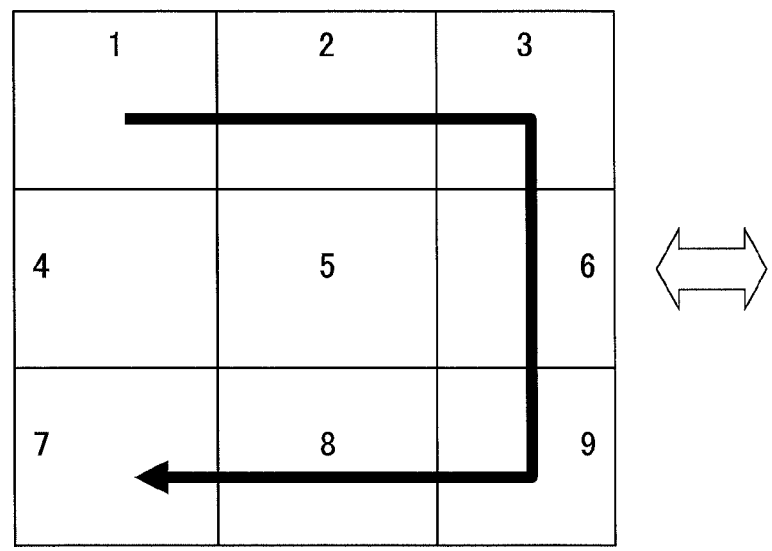

FIG. 20A is a view illustrating another example of an operation by the player performed to the characters displayed in the screen. FIG. 20B is a view illustrating another example of an operation by the player performed to the boxes displayed in the screen. FIG. 20A only illustrates a part of the screen that is illustrated in FIG. 14, in which the enemy character C2 is positioned at the right side, where the friend characters are displayed. FIG. 20B only illustrates a part of the screen that is illustrated in FIG. 15, in which the enemy character C2 is positioned at the right side, where the boxes of the matrix are displayed.

As illustrated in FIG. 20A and FIG. 20B, when a trace passing through the box "1", the box "2", the box "3", the box "6", the box "9", the box "8" and the box "7", in this order, is input, the operation recognizing unit 411 refers to the operation/effect definition data storing unit 421 as illustrated in FIG. 7. Then, the operation/effect definition data storing unit 421 determines that "upper" of the "facing direction" does not match the current direction of the enemy character "right". At this time, the operation recognizing unit 411 converts the definition of the "trace" in the operation/effect definition data storing unit 421, by rotating positions of the boxes in rightward for 90°, such that the "facing direction" becomes "right". Then, the operation/effect definition data storing unit 421 determines that this operation corresponds to the trace ID "1" and specifies the "effect" as "guard by all characters to drastically reduce damage".

Figure 21A:
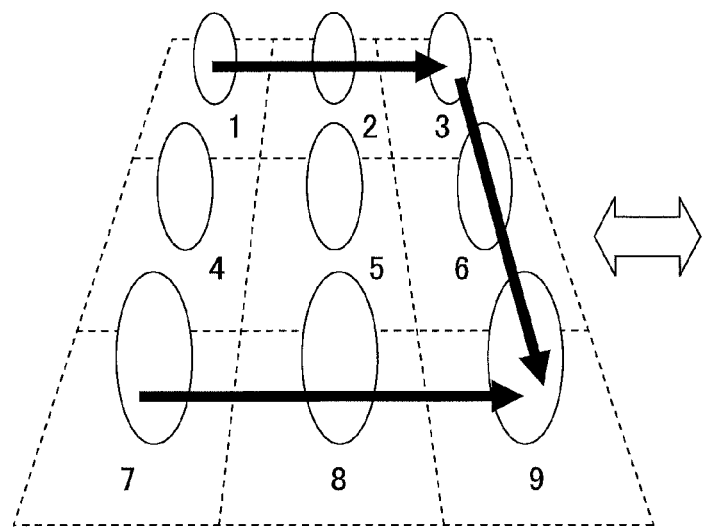
FIG. 21A and FIG. 21B are respective views illustrating another example of an operation by a player.
Figure 21B:
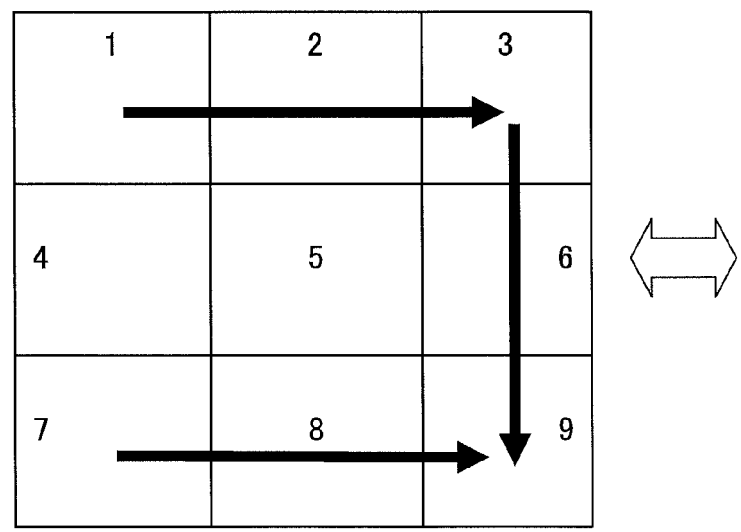

FIG. 21A is a view illustrating another example of an operation by the player performed to the characters displayed in the screen. FIG. 21B is a view illustrating another example of an operation by the player performed to the boxes displayed in the screen. FIG. 21A only illustrates a part of the screen that is illustrated in FIG. 14, in which the enemy character C2 is positioned at the right side, where the friend characters are displayed. FIG. 21B only illustrates a part of the screen that is illustrated in FIG. 15, in which the enemy character C2 is positioned at the right side, where the boxes of the matrix are displayed.

As illustrated in FIG. 21A and FIG. 21B, when a trace passing through the box "1", the box "2" and the box "3", in this order, a trace passing through the box "3", the box "6" and the box "9", in this order, and a trace passing through the box "7", the box "8" and the box "9", in this order, are input in this order, the operation recognizing unit 411 refers to the operation/effect definition data storing unit 421 as illustrated in FIG. 7. Then, the operation/effect definition data storing unit 421 determines that "upper" of the "facing direction" does not match the current direction of the enemy character "right". At this time, the operation recognizing unit 411 converts the definition of the "trace" in the operation/effect definition data storing unit 421, by rotating positions of the boxes in rightward for 90°, such that the "facing direction" becomes "right". Then, the operation/effect definition data storing unit 421 determines that this operation corresponds to the trace ID "2" and specifies the "effect" as "guard by characters at front row and attack by characters at side columns".

Here, the operation input may be recognized by signals input within a predetermined period and a position that is recognized first may be determined as the starting point and a position that is recognized last may be determined as the end point.

Referring back to FIG. 11, at the game processing server 4, the game progression control unit 413 of the request processing unit 41 generates a battle screen in which the effect determined by the operation recognizing unit 411 is reflected (step S120) and sends the battle screen to the terminal device 1 (step S121). Alternatively, before generating the battle screen in which the effect is reflected, a screen or a voice message to confirm the specified operation (a screen including a drawing indicating the trace, a name of the operation or the like) may be generated at the game processing server 4 side, and sent to the terminal device 1 to have the player confirm. Then, the battle screen may be generated after the player confirmed the specified operation. Then, when the specified operation is canceled by the player, operation input may be performed again or the operation content may be changed by the player.

At the terminal device 1, under control of the game logic processing unit 12, the screen display unit 14 displays the battle screen (step S122), and the same operation is repeated to continue the battle.

Thereafter, at the game processing server 4, when the battle processed by the game progression control unit 413 of the request processing unit 41 reaches a predetermined condition (reaches a predetermined points or the like), the definition data control unit 414 changes the definitions of the data in the operation/effect definition data storing unit 421 and/or the character position setting data storing unit 422 of the control data storing unit 42 (step S123). For example, the definition data control unit 414 may increase or decrease the kind of traces usable by the player, or change the content of the effect. It means that the definition data control unit 414 is capable of dynamically changing the definition data in accordance with the situation of the battle or the like.

Thereafter, when the battle processed by the game progression control unit 413 of the request processing unit 41 reaches another predetermined condition (HP of all of the characters at either sides become zero or the like), the game progression control unit 413 determines that the battle is finished (step S124), generates a battle end screen (step S125) and sends the battle end screen to the terminal device 1 (step S126).

At the terminal device 1, under control of the game logic processing unit 12, the screen display unit 14 displays the battle end screen (step S127).

FIG. 22 is a sequence diagram illustrating an example of the process of the embodiment for the application type.

When the player of the terminal device 1 performs a predetermined operation to instruct starting character positioning, and the player operation input unit 11 accepts the operation (step S201), if the character information is not stored in the terminal device 1, under control of the game logic processing unit 12, the server accessing unit 13 sends a request of obtaining character information with the player ID or the like to the game processing server 4 (step S202).

At the game processing server 4, upon accepting the request of obtaining the character information, the character information management unit 45 of the request processing unit 41 obtains information of characters possessed by the player (character information) from the character information database 46 (step S203) and sends the character information to the terminal device 1 (step S204).

At the terminal device 1, the game logic processing unit 12 generates a character position set screen and the screen display unit 14 displays the character position set screen (step S205).

Then, the player performs an operation of character positioning, and the player operation input unit 11 accepts the operation (step S206), if the character positioning by the player is controlled by the game processing server 4, under control of the game logic processing unit 12, the server accessing unit 13 sends a request of setting character positioning with the player ID or the like to the game processing server 4 (step S207).

At the game processing server 4, upon accepting the request of setting character positioning, the character position setting unit 412 of the request processing unit 41 sets the character positioning in the character position setting data storing unit 422 of the control data storing unit 42 (step S208).

Then, when character positioning of the enemy characters are to be sent, at the game processing server 4, the character position setting unit 412 of the request processing unit 41 obtains the character positioning of the enemy characters (enemy character positioning information) from the character position setting data storing unit 422 of the control data storing unit 42 (step S209), and sends the enemy character positioning information to the terminal device 1 (step S210).

At the terminal device 1, the game logic processing unit 12 generates a character positioned screen and the screen display unit 14 displays the character positioned screen (step S211). The character positioned screens are the same as those illustrated in FIG. 12 to FIG. 15.

When the player of the terminal device 1 performs a predetermined operation to instruct starting a battle, and the player operation input unit 11 accepts the operation (step S212), if the starting of the battle is controlled by the game processing server 4, under control of the game logic processing unit 12, the server accessing unit 13 sends a request of starting the battle with the player ID or the like to the game processing server 4 (step S213).

At the game processing server 4, upon accepting the request of starting the battle, if game information is to be sent from the game processing server 4, the game progression control unit 413 of the request processing unit 41 generates the game information (step S214) and sends the game information to the terminal device (step S215).

At the terminal device 1, the game logic processing unit 12 generates a battle screen and the screen display unit 14 displays the battle screen (step S216).

When the player performs a predetermined operation to the character or the box of the matrix, displayed in the screen, and the player operation input unit 11 accepts the operation (step S217), the game logic processing unit 12 specifies the operation based on the operation content and determines the effect corresponding to the specified operation (step S218). Examples of the operation content are the same as those explained above with reference to FIG. 16A to FIG. 21B.

At the terminal device 1, if a result of recognition of the operation is to be sent to the game processing server 4, under control of the game logic processing unit 12, the server accessing unit 13 sends a notification of the operation including the result of recognition of the operation with the player ID or the like to the game processing server 4 (step S219).

At the game processing server 4, upon receiving the notification of the operation, if the game information is to be sent from the game processing server 4, the game progression control unit 413 of the request processing unit 41 generates the game information (step S220) and sends the game information to the terminal device 1 (step S221).

At the terminal device 1, the game logic processing unit 12 generates a battle screen in which the determined effect is reflected and the screen display unit 14 displays the battle screen (step S222), and the same operation is repeated to continue the battle.

Alternatively, before generating the battle screen in which the effect is reflected (before sending the request of notifying an operation to the game processing server 4), a screen or a voice message to confirm the specified operation (a screen including a drawing indicating the trace, a name of the operation or the like) may be generated to have the player confirm. Then, the battle screen may be generated after the player confirmed the specified operation. Then, when the specified operation is canceled by the player, operation input may be performed again or the operation content may be changed by the player.

Thereafter, at the terminal device 1, when the processing battle reaches a predetermined condition (reaches a predetermined points or the like), the game logic processing unit 12 changes the definition of the operation/effect definition data (step S223). For example, the game logic processing unit 12 may increase or decrease the kind of traces usable by the player, or change the content of the effect.

Thereafter, at the terminal device 1, when the processing battle reaches a predetermined condition (HP of all of the characters at either sides become zero or the like), the game logic processing unit 12 determines that the battle is finished (step S224).

If the end of the battle is to be controlled by the game processing server 4, under control of the game logic processing unit 12, the server accessing unit 13 sends a notification of the end of the battle with the player ID or the like to the game processing server 4 (step S225).

At the game processing server 4, upon receiving the notification of the end of the battle, if the game information is to be sent from the game processing server 4, the game progression control unit 413 of the request processing unit 41 generates game information (step S226) and sends the game information to the terminal device 1 (step S227).

An embodiment in which it is necessary for the terminal device 1 to have communication with the game processing server 4, in accordance with necessity, is explained above, as the application type. Alternatively, the processes as described above with reference to FIG. 22 may be performed at the terminal device 1, without having communication with the game processing server 4, as the application type.

At the terminal device 1, the game logic processing unit 12 generates a battle end screen and the screen display unit 14 displays the battle end screen (step S228).

The individual constituents of the terminal device 1 and the game processing server 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

The data processing apparatus of the present invention may be the game processing server 4, the terminal device 1 or combination thereof.

According to the embodiments, a data processing apparatus and a recording medium by which an effect is flexibly generated in accordance with an operation input by a player can be provided.

Although a preferred embodiment of the terminal device 1 and the game processing server 4 has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

In the above embodiment, an example in which the trace is input by an operation of tracing the touch panel display system 119 or the like of the terminal device 1 by the player is explained. However, the method of inputting the operation is not limited so. For example, the operation input may be performed by instructing the starting point or the movement of the trace by voice. Further, touching input, a keyboard input (a numeric keypad or the like) or the like and voice may be combined, and the operation input may be performed such that the starting point is instructed by the touching input, the keyboard input or the like and then, the movement of the trace is instructed by interval or volume of the voice. Further, movement of the terminal device 1 or an external device may be detected by an acceleration sensor (accelerometer) and the movement of the trace may be determined by the detected acceleration value or integrated value (velocity, distance or the like). Further, the operation input may be performed by any methods provided that it is possible to be input by the player to the terminal device 1 as a pattern expressing physical change of a signal, not limited to the trance.

The present application is based on and claims the benefit of priority of Japanese Priority Application No. 2012-263031 filed on Nov. 30, 2012, the entire contents of which are hereby incorporated by reference.

What is claimed is:

1. A data processing apparatus comprising:
an operation definition management unit that manages definition data in which an effect is associated with
a pattern of a predetermined operation input that is a trace of a combination of positions on a predetermined area where an object to which the effect is generated is to be positioned including a specification of an object to which the effect is generated, and
a positional relationship between the predetermined area and an object on which the effect is exerted;
an operation input accepting unit that accepts an operation input by a user;
an operation input recognizing processing unit that recognizes the operation input accepted by the operation input accepting unit by referring to the definition data; and
an effect control unit that performs the effect of the definition data corresponding to the operation input recognized by the operation input recognizing processing unit,
wherein the operation input recognizing processing unit applies the definition data after converting the definition data based on the pattern of the predetermined operation input and the positional relationship when recognizing the operation input accepted by the operation input accepting unit.

2. The data processing apparatus according to claim 1,
wherein the predetermined area includes a plurality of placing positions on which a plurality of the objects to which the effect are generated are respectively positioned, and
the trace is a trace of a combination of two or more of the placing positions on the predetermined area.

3. The data processing apparatus according to claim 1, wherein the predetermined area is an area where a character that is the object to which an effect is generated is positioned.

4. The data processing apparatus according to claim 1, further comprising:
a unit that dynamically changes the definition data.

5. A non-transitory computer-readable recording medium having recorded thereon a program that causes a computer composing a data processing apparatus, comprising:
an operation definition management function that manages definition data in which an effect is associated with
a pattern of a predetermined operation input that is a trace of a combination of positions on a predetermined area where an object to which the effect is generated is to be positioned including a specification of an object to which the effect is generated, and
a positional relationship between the predetermined area and an object on which the effect is exerted;
an operation input accepting function that accepts an operation input by a user;
an operation input recognizing processing function that recognizes the operation input accepted by the operation input accepting function by referring to the definition data; and
an effect control function that performs the effect of the definition data corresponding to the operation input recognized by the operation input recognizing processing function,
wherein the operation input recognizing processing function applies the definition data after converting the definition data based on the pattern of the predetermined operation input and the positional relationship when recognizing the operation input accepted by the operation input accepting function.

* * * * *